United States Patent [19]
Portner et al.

[11] 3,942,869
[45] Mar. 9, 1976

[54] PROJECTION SCREEN UNIT

[75] Inventors: Robert Portner, Blackwood; Phillip Miller, Turnersville, both of N.J.

[73] Assignee: Magna Mir, Inc., Philadelphia, Pa.

[22] Filed: July 12, 1974

[21] Appl. No.: 488,010

[52] U.S. Cl. .............................................. 350/117
[51] Int. Cl.² ....................................... G03B 21/58
[58] Field of Search ........... 350/117, 124, 125, 126, 350/127, 128, 129; 135/15 PQ, 3 R, 4 R, 5 R, 7.1 R; 38/102.5

[56] References Cited
UNITED STATES PATENTS

| 1,728,356 | 9/1929 | Morgan | 135/4 R |
|---|---|---|---|
| 1,819,776 | 8/1931 | Heck | 350/119 |
| 1,843,312 | 2/1932 | Ames | 135/5 R |
| 1,901,963 | 3/1933 | Hansen | 350/117 X |
| 2,060,817 | 11/1936 | Mahoney | 350/125 |
| 2,486,206 | 10/1949 | Renison | 350/117 |
| 2,894,520 | 7/1959 | Roschke | 135/4 R |
| 2,934,076 | 4/1960 | Fulke | 135/7.1 R X |

FOREIGN PATENTS OR APPLICATIONS

| 1,103,575 | 5/1965 | United Kingdom | 135/1 R |
|---|---|---|---|
| 544,137 | 1/1956 | Belgium | 350/117 |
| 723,381 | 2/1955 | United Kingdom | 350/124 |
| 1,216,652 | 12/1970 | United Kingdom | 350/117 |

*Primary Examiner*—L. T. Hix
*Assistant Examiner*—Alan Mathews
*Attorney, Agent, or Firm*—Steele & Petock

[57] ABSTRACT

A screen for a projection system supported by a pair of cross members extending to the four corners of the screen where they receive a tensioning member disposed around the perimeter of the screen and held in stress by a tensioning mechanism secured to a portion of one of the cross members. The cross members may be secured in their "up" position by means of a restraining member and the screen may be tilted forward as permitted by one of several modes of support. The screen may be shaped with curvilinear edges preferably of a catenary configuration to increase tautness which is imparted thereto by the tensioning member.

12 Claims, 5 Drawing Figures

PROJECTION SCREEN UNIT

BACKGROUND OF THE INVENTION

1. Field of the Invention

The subject screen has utility as a projection receiving means for home and/or commercial use and is particularly adapted to be utilized as a "large screen" on the order of six by eight feet for panoramic viewing of slides or movies. Normally a height-width ratio of three to four is used consistent with film size.

2. Prior Art

Screens used in the past and which are commercially used at the present time have innate problems in their construction which makes it extremely difficult for such screens to be constructed of a size much greater than 3 feet by 3 feet or 4 feet by 4 feet. Such screens invariably curl along their vertical edges and in the standard type design where the screens do not have four sided peripheral support, this cannot be readily prevented. The effect of such curling is to produce distortions, shadows, and the like during the actual showing of movies or slides in addition to having an unsightly screen. Furthermore, with the present day commercial design of screens, it is not possible to obtain the degree of tautness necessary to eliminate surface irregularities and produce optimum picture clarity.

The prior art screens are usually supported by a central vertical upright member with tripod legs to prevent the screen from tipping. Such a system prevents the inclining or tilting of the screen which may be desirable to prevent shadows and overcome keystoning where the projection beam is coming from a vertical level approximately that of the base of the screen as required by modern types of projection systems such as that described in our copending Patent Application Ser. No. 488,074 or where made desirable by spectator positioning

SUMMARY OF THE INVENTION

Accordingly, it is an object of the subject invention to provide a screen of suitable construction to be readily utilized in the home despite being of a size on the order of 6 by 8 feet.

It is a further object of the subject invention to provide a screen for the projection of movies or slides and the like which may be conveniently tilted to eliminate shadows and distortion when the projection source is positioned at a vertical level approximately that of the base of the screen.

It is a related object of the subject invention to provide a screen unit which may be tilted and which includes means to readily determine the degree of tilt as required.

It is another object of the subject invention to provide a screen which may be effectively tensioned throughout to reach a degree of drum tautness whereby all creases, folds, and surface irregularities are eliminated which interfere with producing high quality optically clear pictures.

It is yet another object of the subject invention to provide a screen for projection purposes which despite being of large size can be effectively dismantled for storage and quickly reassembled for utilization.

It is still another object of the subject invention to provide a screen for projection purposes in which tensioning to increase screen tautness can be accomplished by means conveniently located and readily accessible.

In accordance with the above objects, the subject invention includes a projection screen unit utilizing a screen material such as fiberglass fabric with beaded matte or lenticular surfaces, particular advantage for which is found in the size range of 6 by 8 feet. The screen material has a receiving means about its perimeter for a cable and is adapted to be stretched and supported by and between a pair of cross members which are diagonally disposed to extend to the corners of the screen member. The cross members may be telescopic and/or foldable and have means for securing the cable at the corners to impart a tensioning effect to the screen to create tautness. The screen material may have curvilinear edges, concave outwardly and in fact the edges may define catenary curves which may follow a hyperbolic or parabolic function as the screen is tensioned to drum-like tautness to eliminate all wrinkles, folds, creases and surface irregularities.

The cable or chain which itself is non-stretchable and inelastic may be effectively tensioned by a rachet mechanism secured to one of the cross members, the lower portion of which form legs for supporting the screen. The screen unit may further be supported by means of a unipod secured in part to the cross member structure which permits the screen to be vertical or tilted. Base members of the unipod assist in achieving front and back stability. In the alternative, suitable legs of the spider variety may replace the unipod which likewise permit the screen to be tiled to eliminate shadows and the like when the projection source is low with respect to the screen.

The subject invention has particular utility in the systems disclosed in copending applications Ser. Nos. 488,074, 488,011 and 487,962.

DETAILED DESCRIPTION

Figure 1:
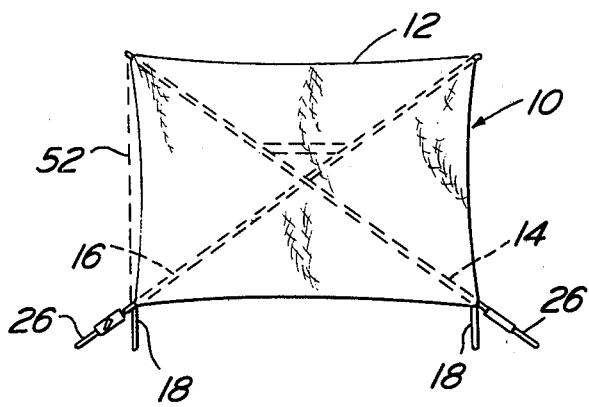
FIG. 1 is a front elevation view showing the screen in an upright position.

With reference to FIG. 1, the projection screen unit 10 is shown having a screen member 12 of suitable material which is extended between cross members 14 and 16 as shown. Unipod 17 (See FIG. 2) or spider legs 18 (FIG. 1) may be used in the alternative or in combination to support the screen unit 10.

Figure 2:
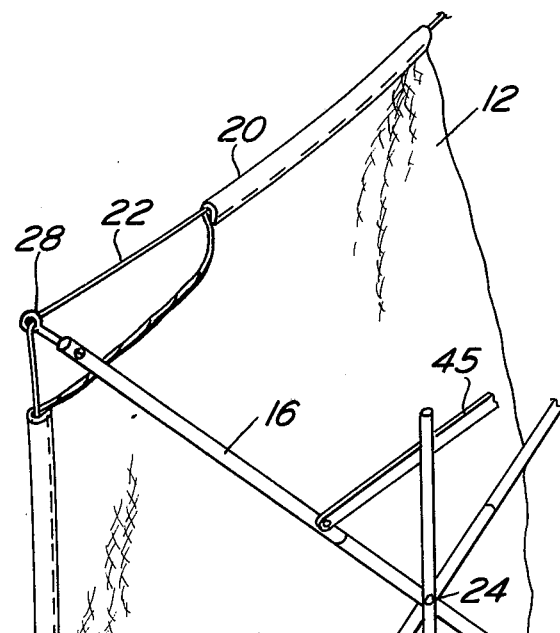
FIG. 2 is a partial perspective view taken from a position to the rear of the screen.

With reference to the partial perspective view of the screen unit 10 shown in FIG. 2, the screen member 12 is a fabric which may be fiberglass, vinyl or any one of a number of alternatives and which may be provided with a beaded, matte or lenticular surface. Pockets 20 are sewn or otherwise provided around the perimeter of the screen member 12.

A relatively inelastic member 22 which may be a cable or a chain and will hereinafter be referred to as a cable extends through the pockets 20 and preferably extends around the entire perimeter of the screen member 12. The screen member 12 and cable 22 are supported by the cross members 14 and 16 which are shown rotatably secured by pin member 24 to permit the cross members 14, 16 to be collapsable. At the lower end of each of the cross members 14, 16, an outrigger extension 26 forms part of the base support for the screen unit 10. Eyebolts 28 or other means such as hooks are used to secure the cables 22 to the cross members 14, 16 and it will be appreciated that the bolts 28 may be open eyed or otherwise to facilitate quick placement of the screen member 12 on the cross members 14, 16. At these corner locations, hair pin rod stiffeners 30 may also be utilized and provide corner rigidity to the screen member 12.

Figure 5:
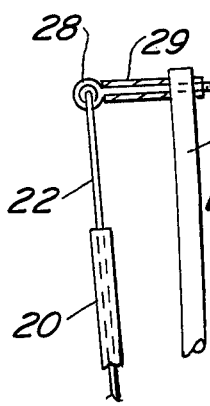
FIG. 5 is a partial side view showing the securement of the cable to one of the cross members at a top corner.

As best seen in FIG. 5 the eyebolts 28 which are utilized on the top two corners are protected within a tongue sleeve 29 to prevent the bolt shank from bending. It is important that approximately a 90° angle be maintained between the shank of eyebolt 28 and the respective cross member 14 or 16 which will produce a spring or bow-like effect in the cross members 14, 16 to maintain tension in the screen material 12. Best results are obtained when the shanks of the eyebolts 28 are at least 4½ inches.

Figure 3:
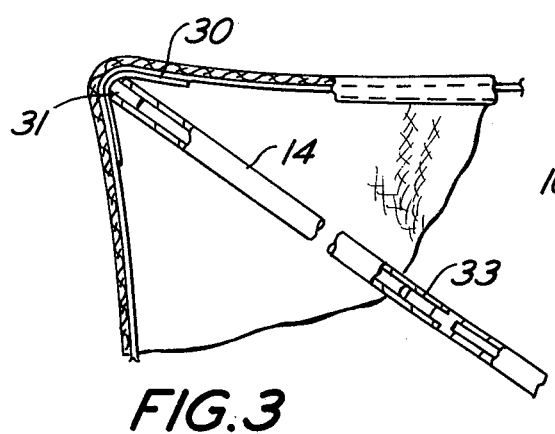
FIG. 3 is a closeup partial section view showing a corner of the screen of a slightly modified embodiment.

With reference to FIG. 3, the stiffeners 30 are shown in a modified emodiment wherein they also serve as supports for the cross members 14, 16 by creating corner pocket areas. Corner stud 31 may be secured to stiffener 30 and receive member 14 shown as being hollow. The eyebolts 28 may thus be eliminated. Also shown in FIG. 3 is a separable cross member 14 which may be dissassembled into sections 33 and 35 and additional sections by means of male-female connections. The cross members 14 and 16 can also be telescopic, hinged or otherwise foldable or separable.

Figure 4:
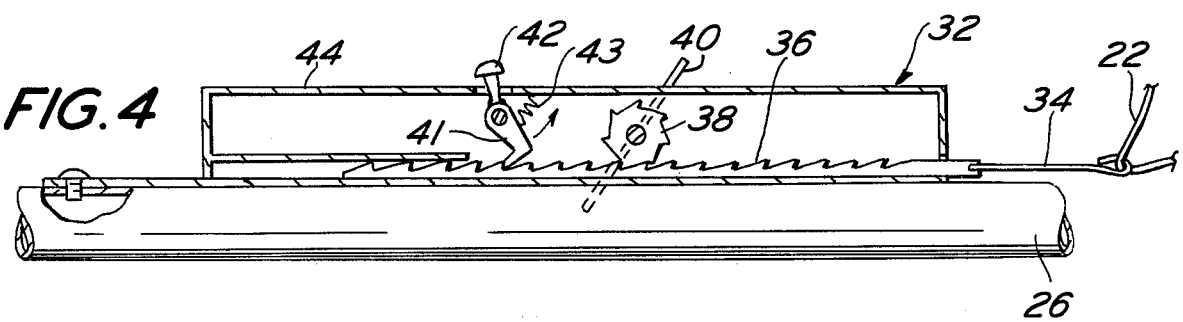
FIG. 4 is a partial section view of the rachet member shown in FIG. 2.

With reference to FIGS. 2 and 4, a tensioning rachet device 32 is shown secured to one of the leg extensions 26. Each of the lower leg extensions 26 may be provided with a rachet device such as described herein. As shown, hooking arm 34 secures the cable 22. The arm 34 is secured to pawl member 36 having notches engageable by the rachet wheel 38 which is adjusted by crank arm 40. A locking member 41 engages the pawl notches and may be released by pulling the handle 42 to the left to overcome the bias of spring 43. Both the ratchet wheel 38 and locking member 41 are pivotally mounted within housing 44.

Once the screen 12 is positioned on the cross members 14, 16 with the cable 12 extending through all pockets 20 and eyebolts 28 or other means as well as through hooking arm 34, tension may be imparted to the closed loop by the ratchet mechanism 32 or other means. A front leverage action is thus applied as a result of the rigid cantilever type extension provided by eyebolt 28 and sleeve 29 configuration.

A restraining member 45 may be firmly secured to one of the cross members and readily attachable to the second member to provide support to the cross members 14, 16 prior to when the screen 12 is hung and after it is removed.

In addition to performing the restraining function, member 45 may also be connected to the upper portion of unipod 17 by any suitable attachment means. It will be noted that connecting member 24 may be an eyebolt which not only connects the cross members 14 and 16 but also serves to support and hold unipod 17. Various types of friction grips may be used as well. At the base of unipod 17, which may be telescopic, a base member 50 is used to support the unipod 17. The base member 50 may also be a telescoping device which can extend a considerable distance to the front of the screen 12 as is necessary to adequately support the screen. The front and rear extremities of base member 50 prevent the screen unit 10 from falling. The unipod 17 may be pivotally secured to the base member 50 to permit the entire screen unit 10 to tilt forward if desired.

A chain 52 or other means as shown in FIG. 1 may be used as a plum line to determine whether the screen is vertical or tilting forward slightly.

While various embodiments of the invention have been shown and described, it will be understood that various modifications may be made. For example, in place of the rachet mechanism 32 which is used as the tensioning device, a camming arrangement may be used as the tensioning device, a camming arrangement may be used to create the desired tautness. Regardless of whether the rachet mechanism or camming means or another equivalent means are used, it will be appreciated that such individual tensioning mechanisms may be placed on one or more of the cross members to provide the desired tautness throughout. The appended claims, therefore, are intended to define the true scope of the invention.

What is claimed is:

1. A projection screen unit comprising:
a pair of diagonally disposed cross rods;
a screen member having sleeve-like receiving means extending around its perimeter;
an inelastic member slidably securable within said receiving means;
means for securing said inelastic member to said cross rods; and
means for imparting tension to said inelastic member.

2. The projection screen unit of claim 1 wherein said screen member is four sided and has curvilinear cuts along its perimeter.

3. The projection screen unit of claim 2 wherein said curvilinear cuts follow catenary curves.

4. The projection screen unit of claim 1 wherein said cross rods have extensions to support said screen unit.

5. The projection screen unit of claim 4 further including additional support legs which are used in conjunction with said extension to provide support for said projection screen unit.

6. The projection screen unit of claim 1 wherein said tension imparting means comprises a rachet mechanism secured to at least one of the cross rods.

7. The projection screen unit of claim 1 further including a restraining member securable to each of said cross rods to provide support.

8. The projection screen unit of claim 7 further including a unipod support member secured to said cross rods and said restraining member.

9. The projection screen unit of claim 1 wherein said receiving means comprises pockets formed from the screen member through which said inelastic member is insertable.

10. The projection screen unit of claim 1 further including hair pin rod stiffeners which are secured to said screen member at the corners to provide further support for said screen member.

11. The projection screen unit of claim 1 wherein the means for securing said inelastic member to said cross rods comprises cantilever extensions for the upper ends of said cross rods, and positioned at approximately 90° to said rods, said cantilever extensions having receiving structure at their ends remote from said cross rods for receiving said inelastic member, and wherein said cantilever extensions are rigid to maintain approximately a 90° angle with said cross rods to cause said cross rods to bow when tension is imparted to said inelastic member thereby causing said screen member to become taut.

12. A projection screen unit comprising:
 a four sided flat screen-like component having doubled over portions around its perimeter to form sleeve-like pockets;
 a cable extendable through said sleeve-like pockets and around the perimeter of said screen-like component;
 diagonally disposed cross support rods positioned to support said screen-like component, said cable being slidably secured near each extremity of each said cross rod; and
 means for imparting tension to said cable whereby tautness is created in said screen-like component.

* * * * *